United States Patent
Asai

(10) Patent No.: US 11,233,893 B2
(45) Date of Patent: *Jan. 25, 2022

(54) COMMUNICATION SYSTEM SELECTION

(71) Applicant: Brother Kogyo Kabushiki Kaisha, Nagoya (JP)

(72) Inventor: Norihiko Asai, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/249,262

(22) Filed: Jan. 16, 2019

(65) Prior Publication Data

US 2019/0149648 A1 May 16, 2019

Related U.S. Application Data

(63) Continuation of application No. 14/090,075, filed on Nov. 26, 2013, now Pat. No. 10,212,267.

(30) Foreign Application Priority Data

Nov. 29, 2012 (JP) .................................. 2012-261753

(51) Int. Cl.
*H04M 1/72412* (2021.01)
(52) U.S. Cl.
CPC .............. *H04M 1/72412* (2021.01)
(58) Field of Classification Search
CPC ..... H04L 41/22; H04L 67/36; H04L 61/2015; H04W 8/005; H04W 48/16; H04W 4/008;
(Continued)

(56) References Cited

U.S. PATENT DOCUMENTS

2005/0221858 A1  10/2005  Hoddie
2007/0086052 A1   4/2007  Furuya
(Continued)

FOREIGN PATENT DOCUMENTS

JP  2011-097167 A  5/2011
JP  2011-146991 A  7/2011

OTHER PUBLICATIONS

"How To Connect Your Android phone to a Wifi Network" (http://www.watchingthenet.com/connect-your-android-phone-to-wireless-network.html. (Year: 2012).*
(Continued)

*Primary Examiner* — Quoc Thai N Vu
(74) *Attorney, Agent, or Firm* — Banner & Witcoff, Ltd.

(57) ABSTRACT

A communication device may have multiple units for communicating through multiple channels. The communication device may also include a display for displaying various screens. The communication device may display a function settings screen for selecting a communication unit to be used for communication with an external device. The communication device may determine whether an external device is already specified. The communication device may also display a device search screen identifying one or more external devices that can communicate with a particular communication unit of the communication device. Further, the communication device may display an updated function settings screen that indicates which communication unit is set to be used for communication with an external device and that identifies which external device is to receive communications from such communication unit.

15 Claims, 13 Drawing Sheets

(58) Field of Classification Search
CPC . H04W 36/14; G06F 3/0482; H04M 1/72519; H04M 1/7253; H04M 2250/06; H04M 1/72412
See application file for complete search history.

(56) References Cited

U.S. PATENT DOCUMENTS

| | | | |
|---|---|---|---|
| 2009/0234953 | A1 | 9/2009 | Braslavsky |
| 2011/0177780 | A1 | 7/2011 | Sato et al. |
| 2012/0022948 | A1 | 1/2012 | Jones et al. |
| 2013/0174223 | A1 | 7/2013 | Dykeman et al. |
| 2013/0262891 | A1* | 10/2013 | Gudlavenkatasiva ............ G06F 1/3287 713/320 |

OTHER PUBLICATIONS

"IPad User Guide" ("iPad User Guide" © 2010 Apple Inc., 154 pages; previously cited) (Year: 2010).*

Mathew Ford, "How to completely clear all Bluetooth connections from your AndroidTM phone", Aug. 2012, https://www.forward.com.au/pfod/serialBluetoothConnections/RemovingBluetoothConnections.html (Year: 2012).*

Shaleen Sinha, "World First Android OS Compatible Direct Bluetooth/Fi-Fi Printer", Jun. 13, 2012; https://www.androidauthority.com/worlds-first-android-os-compatible-direct-bluetoothwi-fi-printer-94476/ (Year: 2012).* https://www.youtube.com/watch?v=8kl9ZVAxsb0 (Year: 2012).*

"How To Connect Your Android phone to a Wifi Network" (http://www.watchingthenet.com/connect-your-android-phone-to-wireless-network.html.).

"IPad User Guide," © 2010 Apple Inc., 154 Pages.

Dec. 22, 2015—(JP) Office Action—App 2012-261753.

Jun. 16, 2016—(U.S.) Non-Final Office Action—U.S. Appl. No. 14/090,075.

Aug. 21, 2017—(U.S.) Final Office Action—U.S. Appl. No. 14/090,075.

Jan. 6, 2017—(U.S.) Non-Final Office Action—U.S. Appl. No. 14/090,075.

Feb. 8, 2018—(U.S.) Non-Final Office Action—U.S. Appl. No. 14/090,075.

Oct. 5, 2018—(U.S.) Notice of Allowance—U.S. Appl. No. 14/090,075.

\* cited by examiner

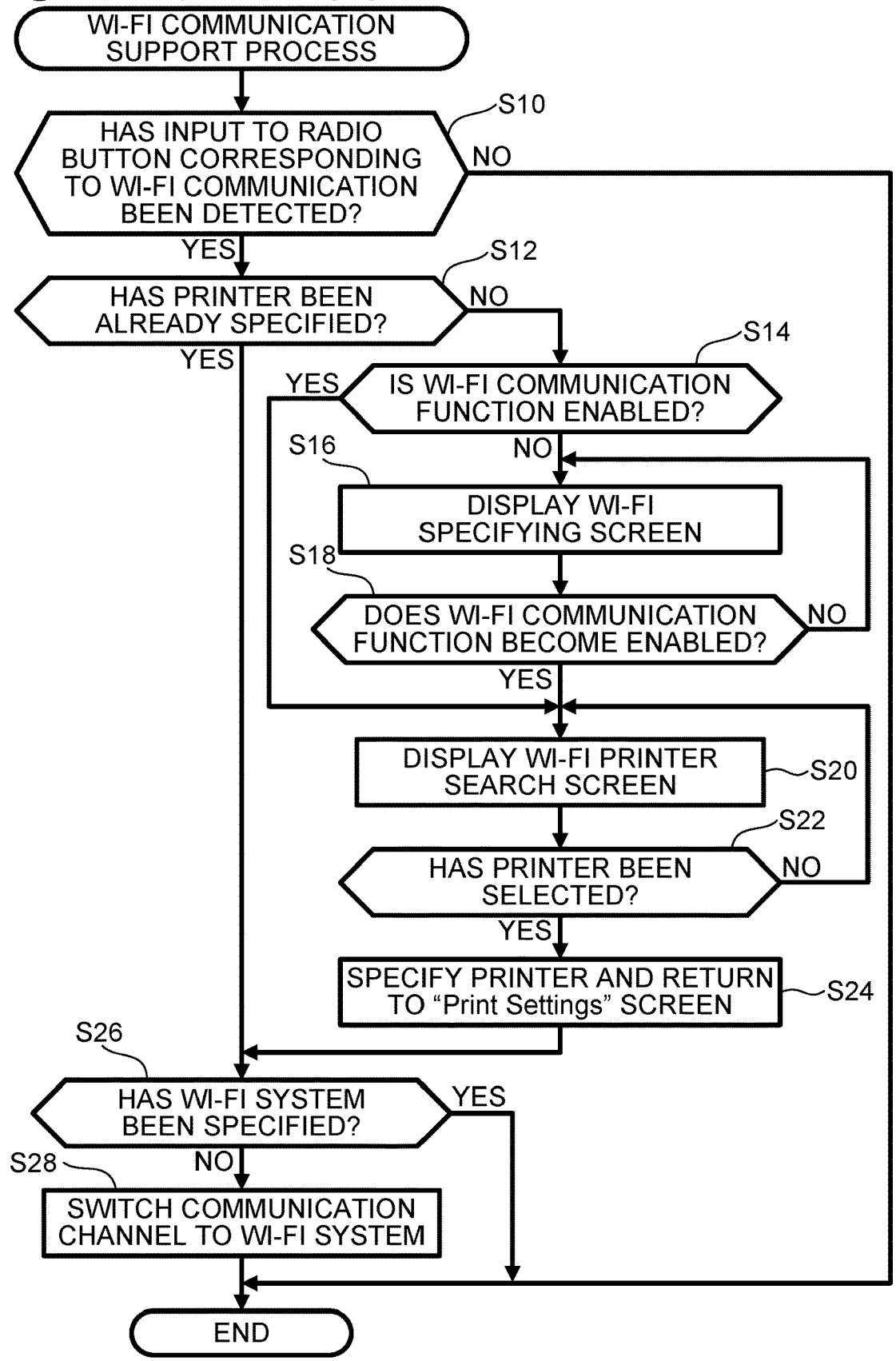

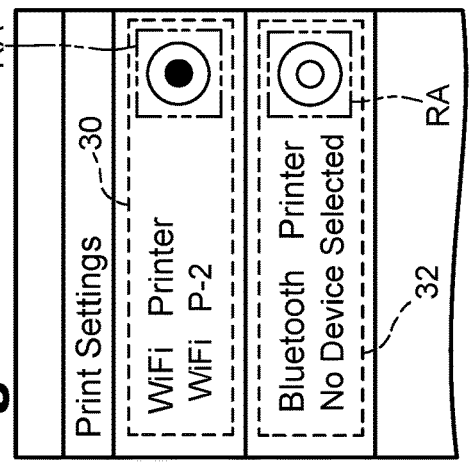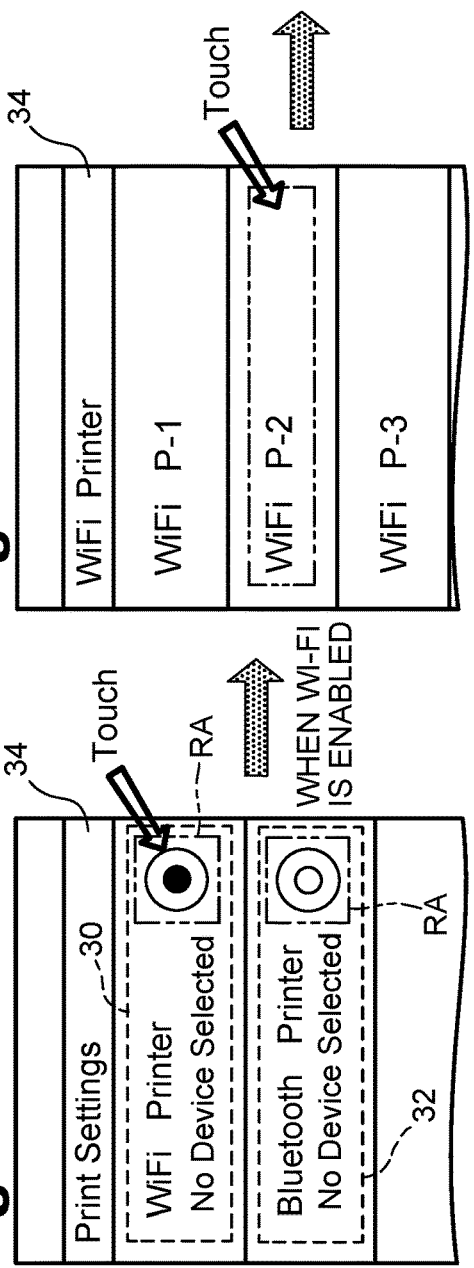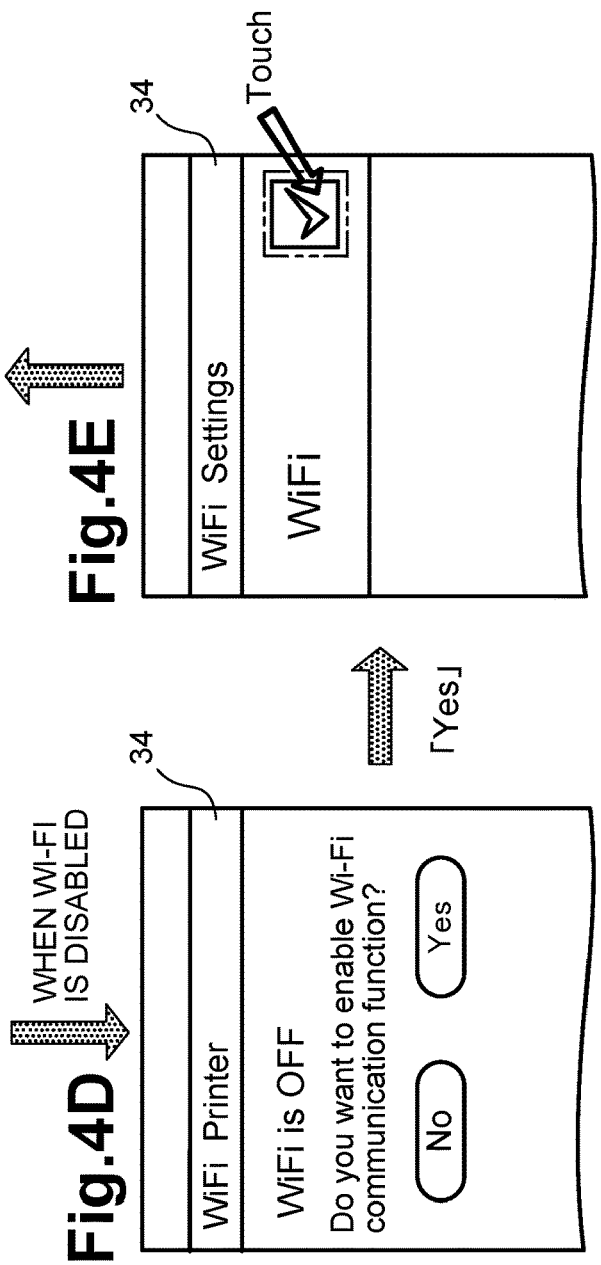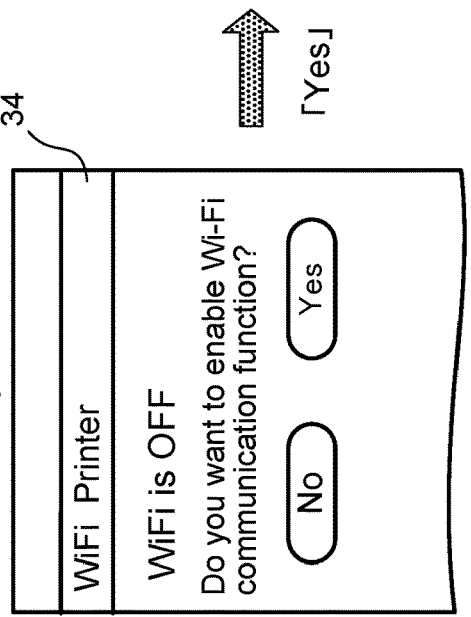

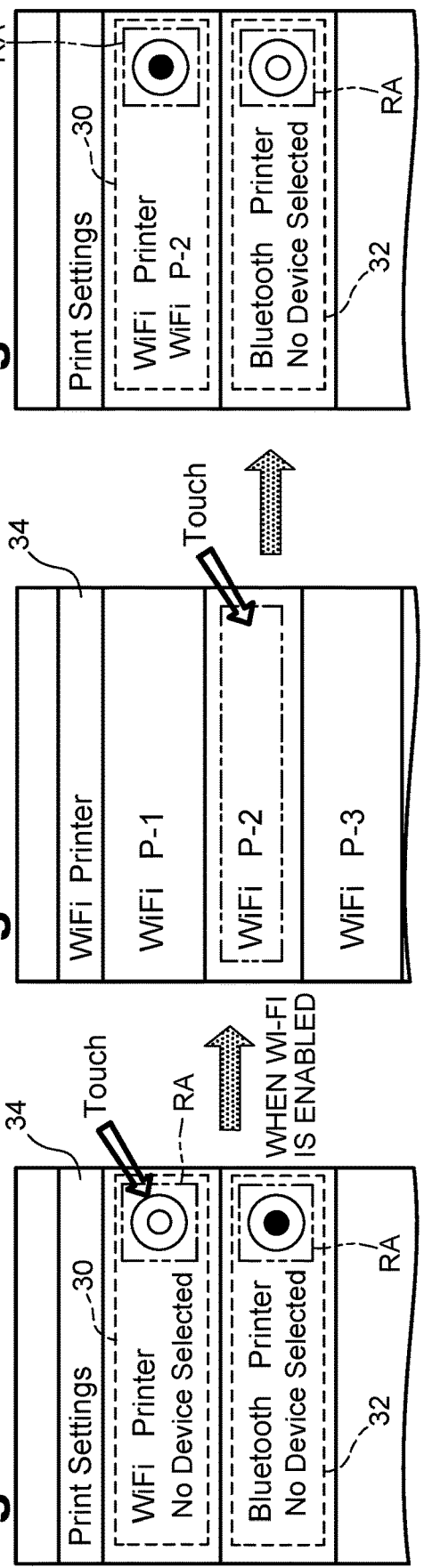

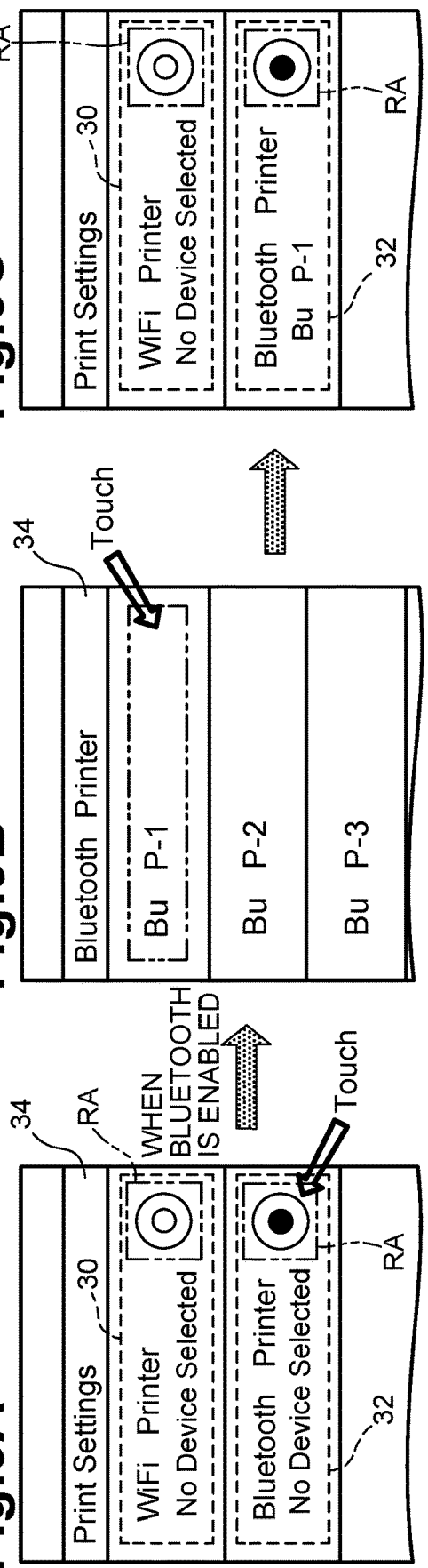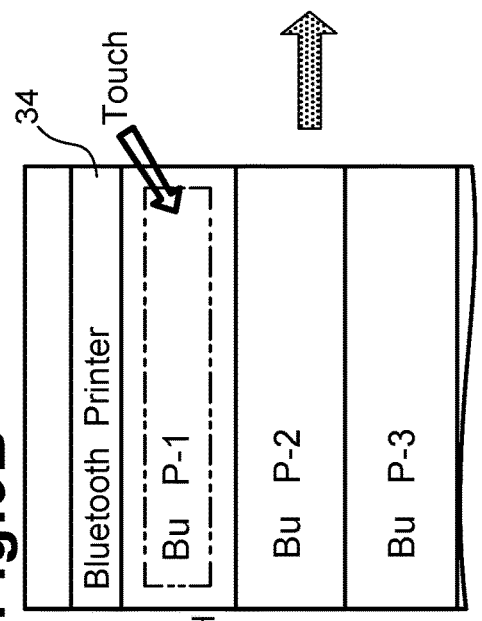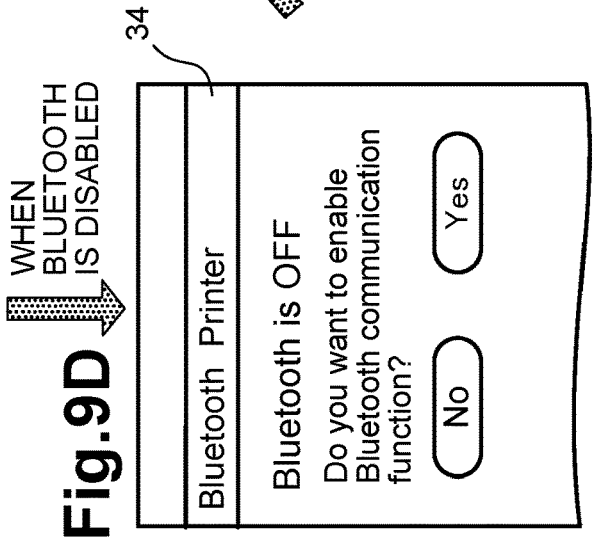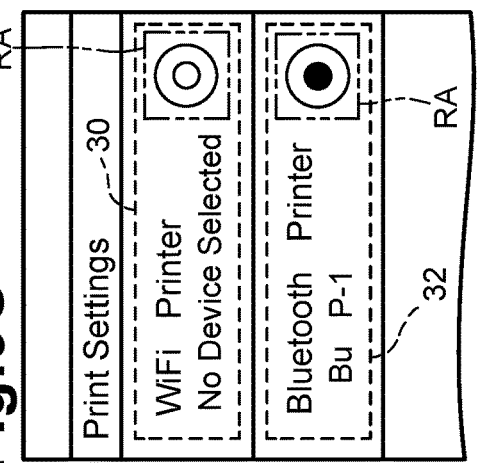

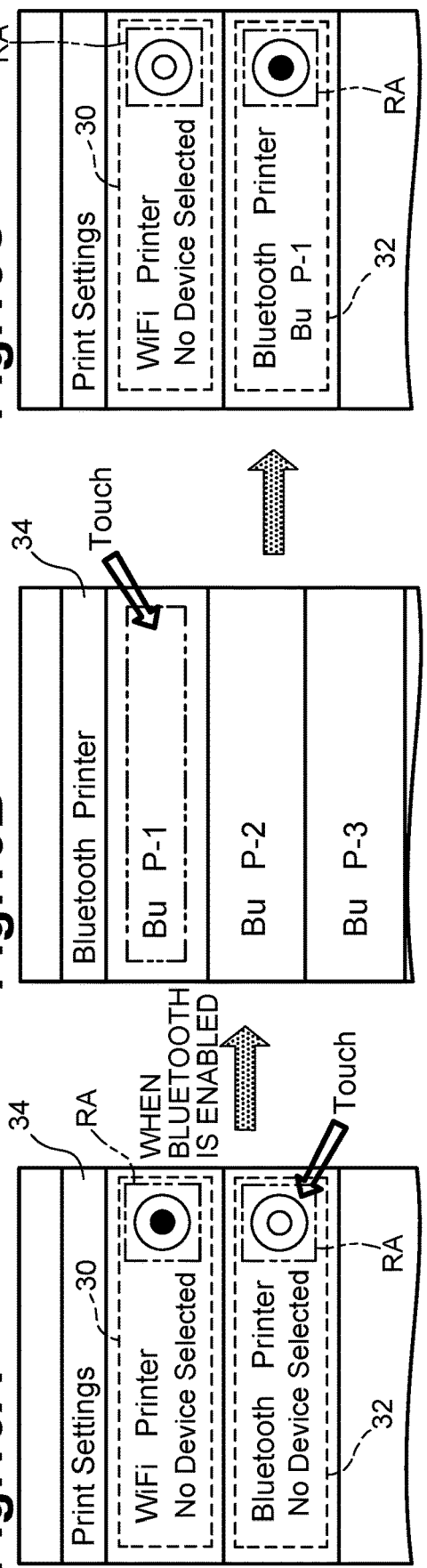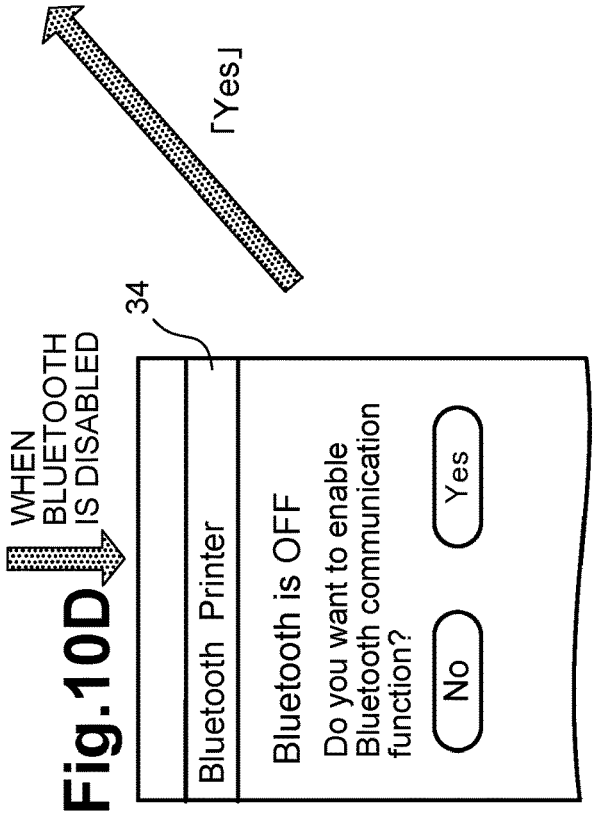

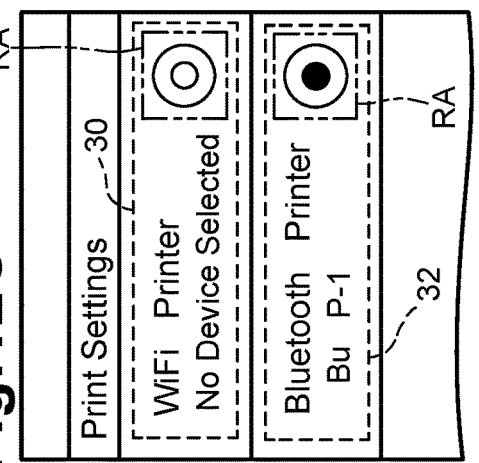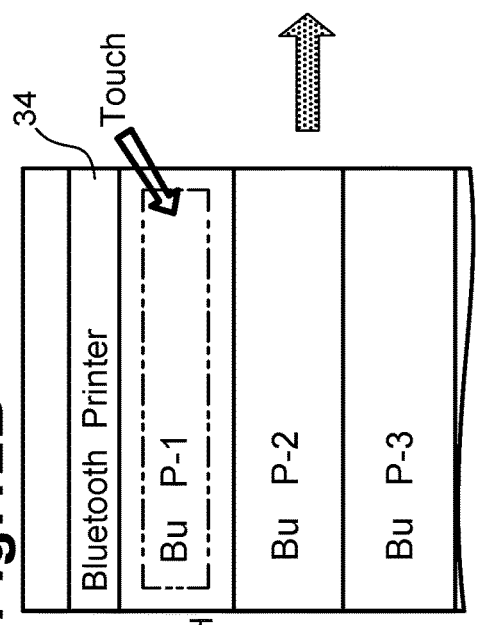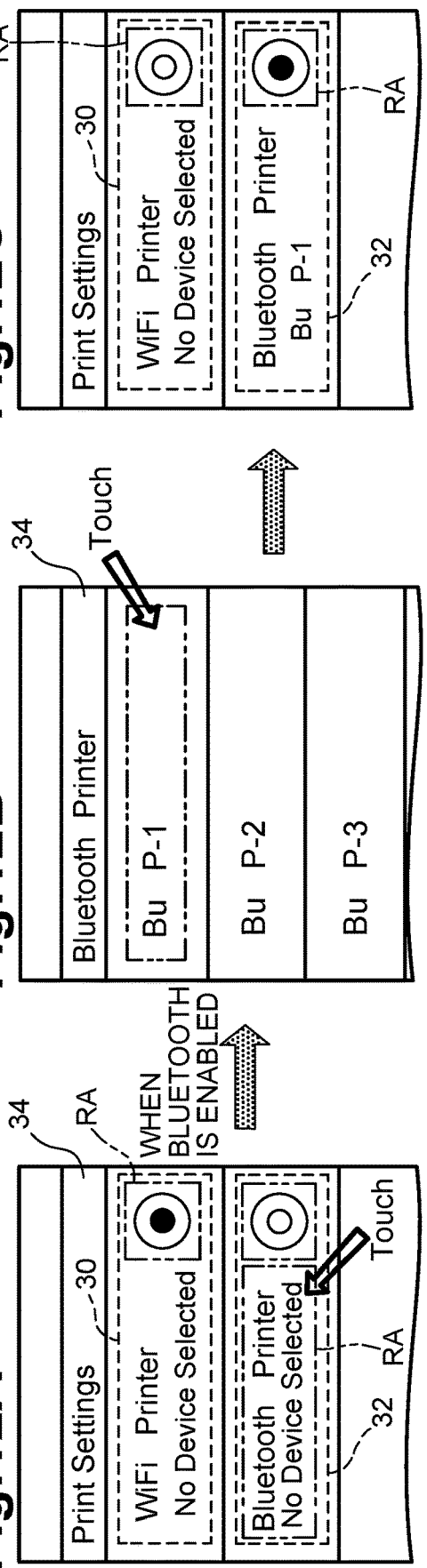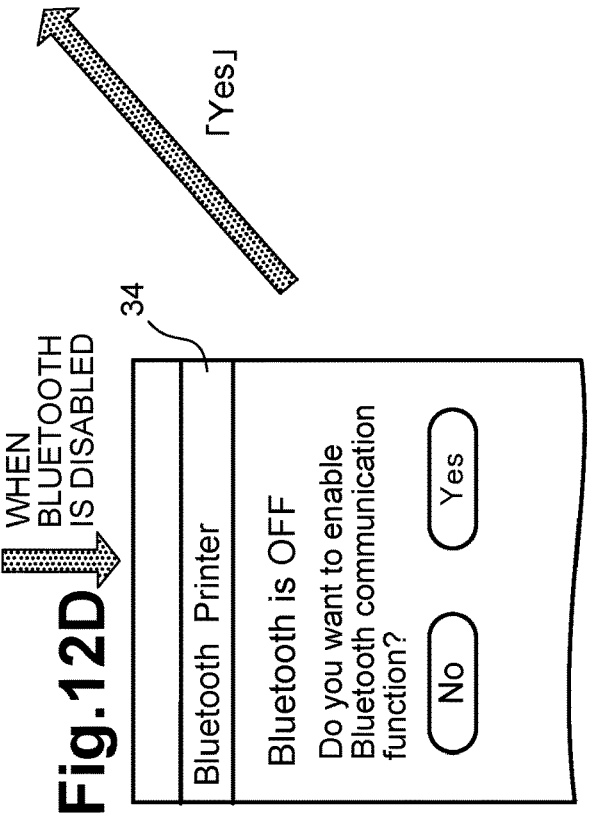

COMMUNICATION SYSTEM SELECTION

CROSS-REFERENCE TO RELATED APPLICATION

This application is a continuation of U.S. patent application Ser. No. 14/090,075, filed Nov. 26, 2013, which claims priority from Japanese Patent Application No. 2012-261753, filed on Nov. 29, 2012, which is incorporated herein by reference in its entirety.

FIELD OF DISCLOSURE

Aspects described herein relate to selecting a communication system, and a computer-readable storage medium storing a communication support program and a communication device for selecting a communication system.

BACKGROUND

There has been known a mobile telephone device that is allowed to perform communication with an external device via the Bluetooth® system (Bluetooth® is a registered trademark owned by BLUETOOTH SIG. INC. of Kirkland, Wash.) and/or a wireless local area network ("LAN"), selectively.

BRIEF SUMMARY

When a device is configured to communicate using a plurality of communication channels, in order to perform communication between the device and an external device, a user may be required to perform an input operation on the device to select a communication channel and another input operation to specify a communication target device with which to exchange communications using the selected communication channel. Some users may find such input operations bothersome.

Aspects described herein provide a computer-readable storage medium storing a communication support program and a communication device that may facilitate an input operation required to perform communication with an external device.

According to an exemplary embodiment of the disclosure, a non-transitory computer-readable storage medium stores computer-readable instructions that may be executed by a communication device comprising a first communication unit, a second communication unit, and a display unit. When executed, the computer-readable instructions may instruct the communication device to: display, on the display unit, a function settings screen (e.g., a print settings screen) comprising a first option (e.g., a radio button, check box, or other field) for selecting the first communication unit and a second option for selecting the second communication unit; determine whether an external device configured to communicate with the first communication unit (e.g., a WiFi unit or Bluetooth unit) is specified; display, on the display unit, a device search screen identifying one or more external devices configured to communicate using the first communication unit; and display, on the display unit, an updated function settings screen indicating that the first communication unit is set to be used for communication with the external device in response to determining that the external device is specified.

According to another embodiment of the disclosure, a non-transitory computer-readable storage medium stores computer-readable instructions therein that may be executed by a communication device. The communication device may include a first communication unit, a second communication unit, and a display unit. When executed, the computer-readable instructions may instruct the communication device to: display, on the display unit, a device search screen identifying one or more external devices configured to communicate using the first communication unit; determine that a particular external device from among the one or more external devices displayed on the device search screen is selected; determine whether the communication device is set to use the second communication unit for communication with the particular external device in response to determining that the particular external device is selected; and set the communication device to use the first communication unit for communicating with the particular external device in response to determining that the communication device is set to use the second communication unit.

According to another embodiment of the disclosure, a communication device comprises a first communication unit configured to communicate using a first protocol (e.g., WiFi, Bluetooth, etc.); a second communication unit configured to communicate using a second protocol (e.g., WiFi, Bluetooth, etc.); a display unit; at least one processor; and a memory storing computer-readable instructions therein. When the computer-readable instructions are executed by the at least one processor, they may instruct the communication device (e.g., a smartphone, tablet, etc.) to: display, on the display unit, a function settings screen comprising a first option for selecting the first communication unit and a second option for selecting the second communication unit; determine whether an external device configured to communicate with the first communication unit is specified when the first option is selected on the function settings screen; and display, on the display unit, an updated function settings screen indicating that the first communication unit is set to be used for communication with the external device in response to determining that the external device is specified.

According to another embodiment, the disclosure provides a communication device comprising a first communication unit; a second communication unit; a display unit; at least one processor; and a memory storing computer-readable instructions therein. When the computer-readable instructions are executed by the at least one processor, they may instruct the communication device to: display, on the display unit, a device search screen identifying one or more external devices configured to communicate using the first communication unit; determine that a particular external device from among the one or more external devices displayed on the device search screen is selected; determine whether the communication device is set to use the second communication unit for communication with the particular external device in response to determining that the particular external device is selected; and set the communication device to use the first communication unit for communicating with the particular external device in response to determining that the communication device is set to use the second communication unit.

This summary is not intended to identify critical or essential features of the disclosure, but instead merely summarizes certain features and variations thereof. Other details and features will also be described in the sections that follow.

BRIEF DESCRIPTION OF THE DRAWINGS

Aspects of the disclosure are illustrated by way of example and not by limitation in the accompanying figures in which like reference characters indicate similar elements.

FIG. 3 is a flowchart depicting an example Wi-Fi® communication support process in the first illustrative embodiment according to one or more aspects of the disclosure.

FIGS. 4A, 4B, 4C, 4D, and 4E are state diagrams depicting a transition of states of the display screen in response to a selection when a printer has not yet been specified in the first illustrative embodiment according to one or more aspects of the disclosure.

FIGS. 5A, 5B, 5C, 5D, and 5E are state diagrams depicting a transition of states of the display screen in response to another selection when a printer has not yet been specified in the first illustrative embodiment according to one or more aspects of the disclosure.

FIGS. 9A, 9B, 9C, and 9D are state diagrams depicting a transition of states of the display screen in response to a selection when a printer has not yet been specified in the first illustrative embodiment according to one or more aspects of the disclosure.

FIGS. 10A, 10B, 10C, and 10D are state diagrams depicting a transition of states of the display screen in response to a selection when a printer has not yet been specified in the first illustrative embodiment according to one or more aspects of the disclosure.

FIGS. 12A, 12B, 12C, and 12D are state diagrams depicting a transition of states of the display screen in response to a selection of the printer selection field in the first illustrative embodiment according to one or more aspects of the disclosure.

DETAILED DESCRIPTION

For a more complete understanding of the present disclosure, needs satisfied thereby, and the objects, features, and advantages thereof, reference is now made to the following descriptions taken in connection with the accompanying drawings.

First Illustrative Embodiment

Hereinafter, a first illustrative embodiment according to the disclosure is described with reference to the accompanying drawings.

Figure 1:
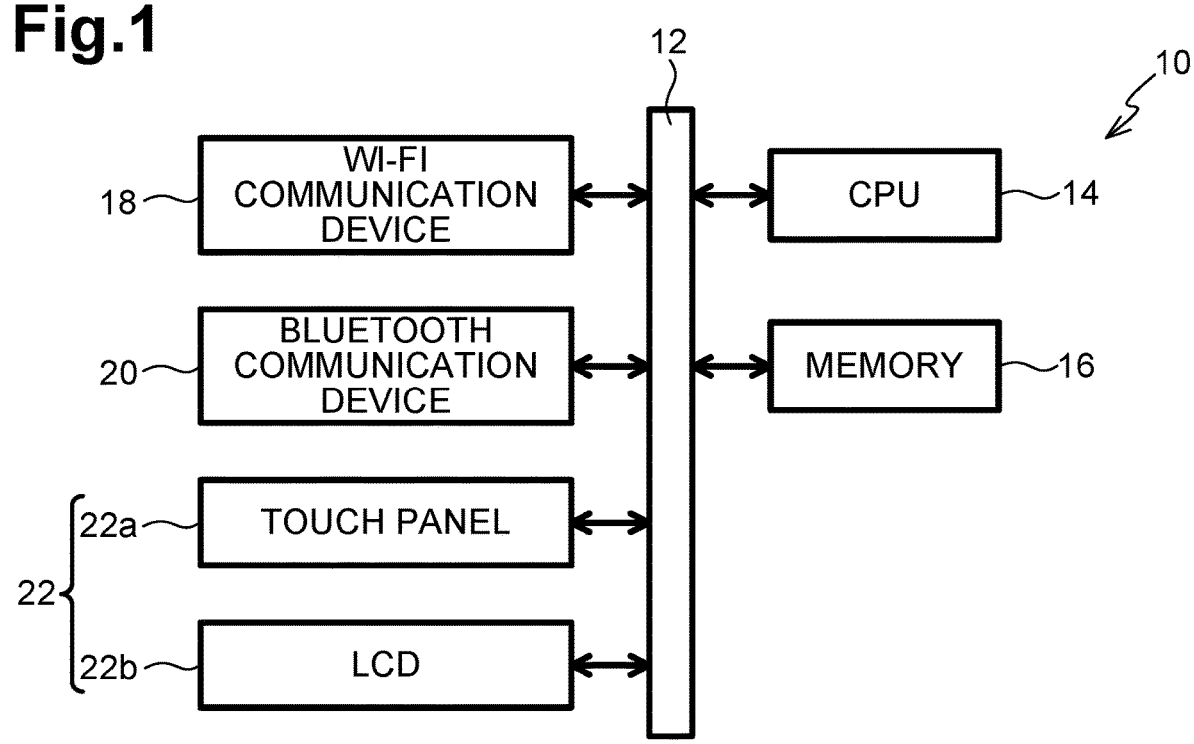
FIG. 1 is a diagram depicting a system configuration in a first illustrative embodiment according to one or more aspects of the disclosure.

FIG. 1 depicts a configuration of a mobile telephone device 10 as a communication device according to the first illustrative embodiment. In the mobile telephone device 10, a central processing unit ("CPU") 14, a memory 16, a Wi-Fi® communication device 18, a Bluetooth® communication device 20, and a user interface 22 may be connected with each other via an input and output port 12 (e.g., a data bus) and may be allowed to perform communication with each other. The CPU 14 may be configured to execute a program stored in the memory 16 that may be a nonvolatile memory. The memory 16 may store various setting values used in communication via the Wi-Fi® communication device 18 or in communication via the Bluetooth® communication device 20 as well as an operating system ("OS") and various programs. The Wi-Fi® communication device 18 may be an interface for performing wireless communication in compliance with a Wireless Fidelity ("Wi-Fi®") standard (Wi-Fi® is a registered certification mark owned by the Wi-Fi Alliance of Austin, Texas). Hereinafter, wireless communication performed in compliance with the Wi-Fi® standard may be referred to as "communication using the Wi-Fi® system" or "Wi-Fi® communication". The Bluetooth® communication device 20 may be an interface for performing wireless communication in compliance with a Bluetooth® standard. Hereinafter, wireless communication performed in compliance with the Bluetooth® standard may be referred to as "communication using the Bluetooth® system" or "Bluetooth® communication". The mobile telephone device 10 may comprise, as the user interface 22, a liquid crystal display ("LCD") 22b and a touch panel ("TP") 22a for accepting a user's input. In the illustrative embodiment, the user interface 22 may be configured with the LCD 22b and the touch panel 22a placed on top of the LCD 22b. The touch panel 22a may be configured to detect a contact or proximity of an instruction device, for example, a finger or a stylus, to the touch panel 22a.

Communication using the Wi-Fi® system and communication using the Bluetooth® system may be available for the mobile telephone device 10 to perform communication with an external device, for example, a printer. That is, the mobile telephone device 10 may be allowed to perform communication with a plurality of external printers (not depicted). Each of the plurality of external printers may be allowed to perform communication using at least one of the Wi-Fi® system and the Bluetooth® system. As such, each of the plurality of external printers may perform communication with the mobile telephone device 10 via at least one of the Wi-Fi® system and the Bluetooth® system.

In an illustrative embodiment, a communication support program, a type of application program, may be stored in the memory 16 to facilitate input operations to the touch panel 22a when a communication method is selected from the Wi-Fi® system and the Bluetooth® system and when a printer targeted for communication using the selected communication method is selected. In an illustrative embodiment, there may be at least two communication channels, for example, a communication channel for accessing a printer via communication using the Wi-Fi® system and a communication channel for accessing a printer via communication using the Bluetooth® system. Selecting Wi-Fi® communication may include selecting the communication channel for accessing a printer via communication using the Wi-Fi® system, and selecting Bluetooth® communication may include selecting the communication channel for accessing a printer via communication using the Bluetooth® system.

Figure 2:
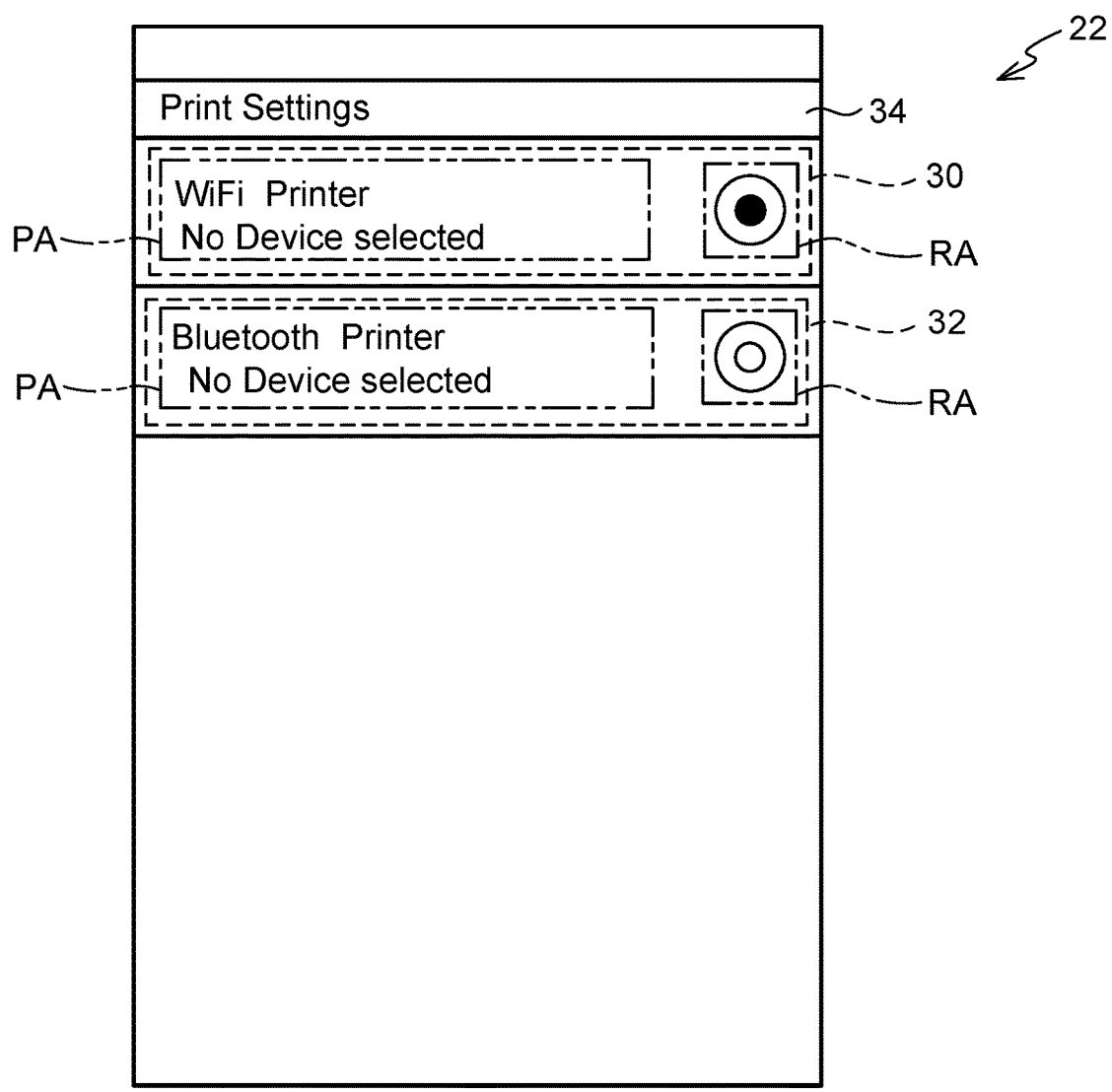
FIG. 2 illustrates a display screen displayed on a display in the first illustrative embodiment according to one or more aspects of the disclosure.

FIG. 2 illustrates an example of display screens displayed on the LCD 22b, particularly, an example selection screen for selecting a communication channel for communication with a printer using the Wi-Fi® system and communication with a printer using the Bluetooth® system. In a title display field 34, for example, "Print Settings" may be indicated as a title of the selection screen (or function settings screen). In the illustrative embodiment, a field corresponding to communication using the Wi-Fi® system (e.g., a selection support field 30), and a field corresponding to communication using the Bluetooth® system (e.g., a selection support field 32) may be listed. Each of the selection support fields 30 and 32 may comprise a printer selection field PA for selecting a printer and a radio button RA for selecting a communication channel. The selection screen depicted in FIG. 2 may be displayed by the execution of the communication support program stored in the memory 16 by the CPU 14.

The printer selection field PA in the selection support field 30 may be a field in which an operation for selecting a printer to be used for communication with the mobile telephone device 10 via Wi-Fi® communication (hereinafter, referred to as a "Wi-Fi® printer") may be allowed to be performed. The printer selection field PA in the selection support field 32 may be a field in which an operation for selecting a printer to be used for communication with the mobile telephone device 10 via Bluetooth® communication, (hereinafter, referred to as a "Bluetooth® printer") may be allowed to be performed.

The radio button RA in the selection support field 30 may be a field for specifying the Wi-Fi® system as a channel to be used for communication with an external device. The radio button RA in the selection support field 32 may be a field for specifying the Bluetooth® system as a channel to be used for communication with an external device. The radio button RA selected as the channel to be used for communication may be indicated in a manner different from the other radio button RA that might not be selected as the channel to be used for communication. For example, the radio buttons RA may be indicated in respective different colors. Such an indication may be adopted to visually display which one of the channels has been specified as the channel to be used for communication. In FIG. 2, for example, the Wi-Fi® system has been specified as the channel to be used for communication.

In the illustrative embodiment, one of the Wi-Fi® system and the Bluetooth® system may always be specified as the channel to be used for communication. Therefore, an indication representing that the channel has been specified as the channel to be used for communication may always be given in one of the radio buttons RA in the selection support fields 30 and 32. For example, as the communication support program is installed on the mobile telephone device 10, the Wi-Fi® system may be specified as the channel to be used for communication for an initial setting.

Each set of the printer selection field PA and the radio button RA depicted in FIG. 2 may correspond to an appropriate one of the selection support fields 30 and 32. For example, the selection support fields 30 and 32 may include the respective printer selection fields PA and then the radio buttons RA may be embedded into the selection support fields 30 and 32, respectively. The radio buttons RA may be an element having a rectangular shape. When a user selects (e.g., touches) an area within the four corners of the radio button RA and the selection (e.g., touch) is detected, the corresponding radio button RA may be selected. In some embodiments, a user may effectively select a radio button RA by selecting any portion of the corresponding selection support field 30, 32. For example, selecting any portion of the selection support field 30 may be detected as a selection of the radio button RA within that selection support field 30. Further, in some embodiments, it might not be necessary to correspond the selection support fields 30 and 32 to the respective printer selection fields PA and embed the radio buttons RA into the selection support fields 30 and 32, respectively.

Each of the printer selection fields PA may comprise a field for displaying a name of a printer selected as a communication target in a lower portion thereof. When a printer as a communication target has not yet been specified, an indication representing that a communication-target printer has not yet been specified may be displayed in this field. In FIG. 2, for example, an indication when any of a communication-target printer for Wi-Fi® communication (hereinafter, referred to as a "Wi-Fi® printer") and a communication-target printer for Bluetooth® communication (hereinafter, referred to as a "Bluetooth® printer") has been specified may be displayed. Alternatively, for example, a message stating "No Device selected" may be displayed as the indication representing that a communication-target printer has not yet been specified.

Hereinafter, a function with which to facilitate a process for specifying a communication channel for communication with a printer by an input operation to the touch panel 22a, using the communication support program, is described.

FIG. 3 depicts a procedure of a Wi-Fi® communication support process according to an illustrative embodiment. The Wi-Fi® communication support process may be implemented by a communication support program stored in the memory 16, which may be repeatedly performed by the CPU 14, for example, at predetermined intervals.

In step S10, the CPU 14 may determine whether an input to the radio button RA in the selection support field 30 corresponding to Wi-Fi® communication has been detected. The input to the radio button RA may be performed by a user's input operation, for example, a touch to the radio button RA. When a positive determination is made in step S10 (YES at S10), in step S12, the CPU 14 may determine whether a Wi-Fi® printer to be used for communication with the mobile telephone device 10 has already been specified. When a negative determination is made in step S12 (NO at S12), in step S14, the CPU 14 may determine whether a communication function using the Wi-Fi® system (hereinafter, also referred to as a "Wi-Fi® communication function") is enabled. For example, when the power of the Wi-Fi® communication device 18 is on or when the Wi-Fi® communication device 18 has been recognized by the OS as a communication device to be used, the Wi-Fi® communication function is enabled. When a negative determination is made in step S14, in step S16, the CPU 14 may display, on the LCD 22b, a Wi-Fi® specifying screen for enabling the Wi-Fi® communication function. This situation may be illustrated in FIGS. 4A and 4D, for example. That is, when the Wi-Fi® communication function is disabled at the time of the selection of the radio button RA in the selection support field 30 corresponding to Wi-Fi® communication as depicted in FIG. 4A, the screen may be switched to the Wi-Fi® specifying screen (or communication unit enablement screen) depicted in FIG. 4D to prompt the user to enable the Wi-Fi® communication function. In response to this, the user may operate the touch panel 22a in accordance with guidance displayed on the Wi-Fi® specifying screen to enable the Wi-Fi® communication function (see FIG. 4E). In FIG. 4E, a field of an execution button to which an input operation for instructing the performance of communication using the Wi-Fi® system may be performed may be displayed on the LCD 22b, for example.

As depicted in FIG. 3, after the CPU 14 displays the Wi-Fi® specifying screen, the CPU 14 may wait until the Wi-Fi® communication function becomes enabled by the user's operation for instructing the performance of communication using the Wi-Fi® system (e.g., step S18). Then, when a positive determination is made in step S18 after the Wi-Fi® communication function becomes enabled by the user's operation or when a positive determination is made in step S14, the routine may proceed to step S20.

In step S20, the CPU 14 may display a Wi-Fi® printer search screen. That is, as depicted in FIG. 4B, the CPU 14 may display, on the LCD 22b, a screen on which one or more communicable Wi-Fi® printers may be listed as one or more candidates for a communication party device for Wi-Fi® communication. The Wi-Fi® printer search screen may be displayed through the switching of the screen from the screen depicted in FIG. 4A. Therefore, another title, for example, "Wi-Fi® printer", may be displayed in the title display field 34 to indicate that the Wi-Fi® printer search screen may be another screen. In response to this, when the user performs an input operation for selecting a specific Wi-Fi® printer, the CPU 14 may determine that a printer has been selected in processing of step S22 in FIG. 3 and the routine may proceed to step S24. In step S24, the CPU 14 may specify the selected printer as the communication party device for Wi-Fi® communication and display an updated function settings screen (e.g., the "Print Settings" screen) as depicted in FIG. 4C.

FIG. 4A illustrates a situation in which any printer has not been specified first. Therefore, the indication representing that a Wi-Fi® printer has not been specified yet, for example, a message "No Device selected", may be displayed in the selection support field 30. In FIG. 4C, the name of the specified Wi-Fi® printer (e.g., "Wi-Fi P-2") may be displayed.

When the processing of step S24 in FIG. 3 has been completed or when a positive determination is made in step S12, the routine may proceed to step S26. In step S26, the CPU 14 may determine whether the Wi-Fi® system has been specified as the communication channel for communication with the printer at the time the positive determination is made in step S10, and more specifically, immediately before the radio button RA in the selection support field 30 corresponding to communication using the Wi-Fi® system is selected. When a negative determination is made in step S26, in step S28, the CPU 14 may switch the channel to be used for communication with the printer to the communication channel via Wi-Fi® communication and specify the communication channel via Wi-Fi® communication as the channel to be used for communication. When the channel to be used for communication is switched to use Wi-Fi® communication, an indication that the communication channel to be used for communication with the printer is the Wi-Fi® system may be stored in the memory 16. Thereafter, when an operation for performing communication with the printer is again performed after communication is performed with the printer and the communication session has ended, the Wi-Fi® system may be specified as the communication channel to be used for communication with the printer, as the initial setting.

FIGS. 5A to 5E illustrate a situation that occurs when a negative determination is made in step S26. That is, even when the Bluetooth® system has been specified as the communication channel to be used first as apparent from the indication of the radio button RA in the selection support field 32 corresponding to communication using the Bluetooth® system in FIG. 5A, the communication channel to be used may be switched to the Wi-Fi® system (see FIG. 5C) by the specification of the Wi-Fi® printer (see FIG. 5B). For example, when the Wi-Fi® system has been specified as the communication channel as depicted in FIG. 4A, the Wi-Fi® system may be continuously selected as the communication channel after the Wi-Fi® printer is selected. Therefore, the processing of switching the communication channel might not be performed.

When the processing of step S28 has been completed, when a negative determination is made in step S10, or when a positive determination is made in step S26, the CPU 14 may end an instance of the Wi-Fi® communication support process.

Figure 6:
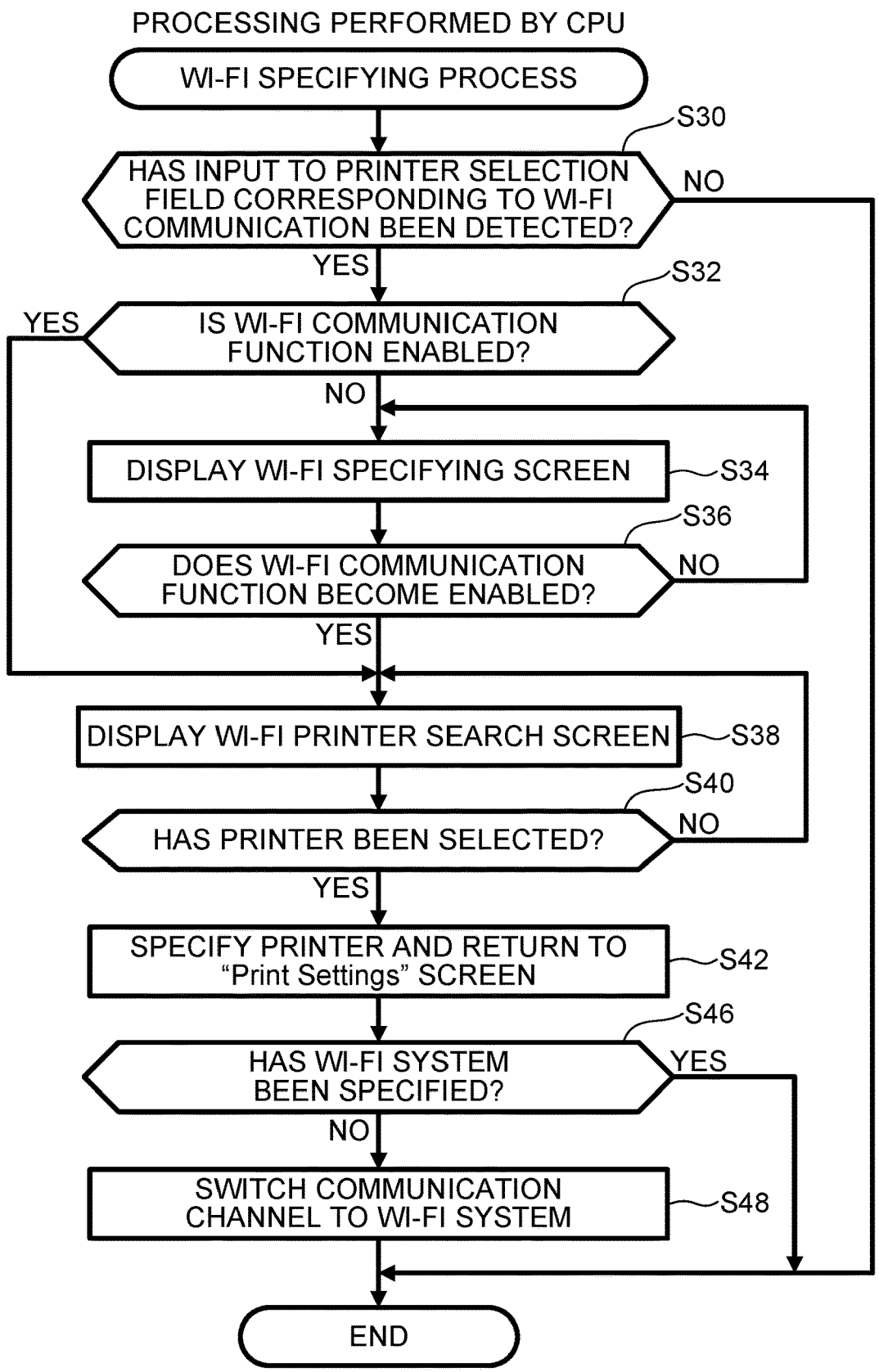
FIG. 6 is a flowchart depicting an example Wi-Fi® specifying process in the first illustrative embodiment according to one or more aspects of the disclosure.
Figure 7:
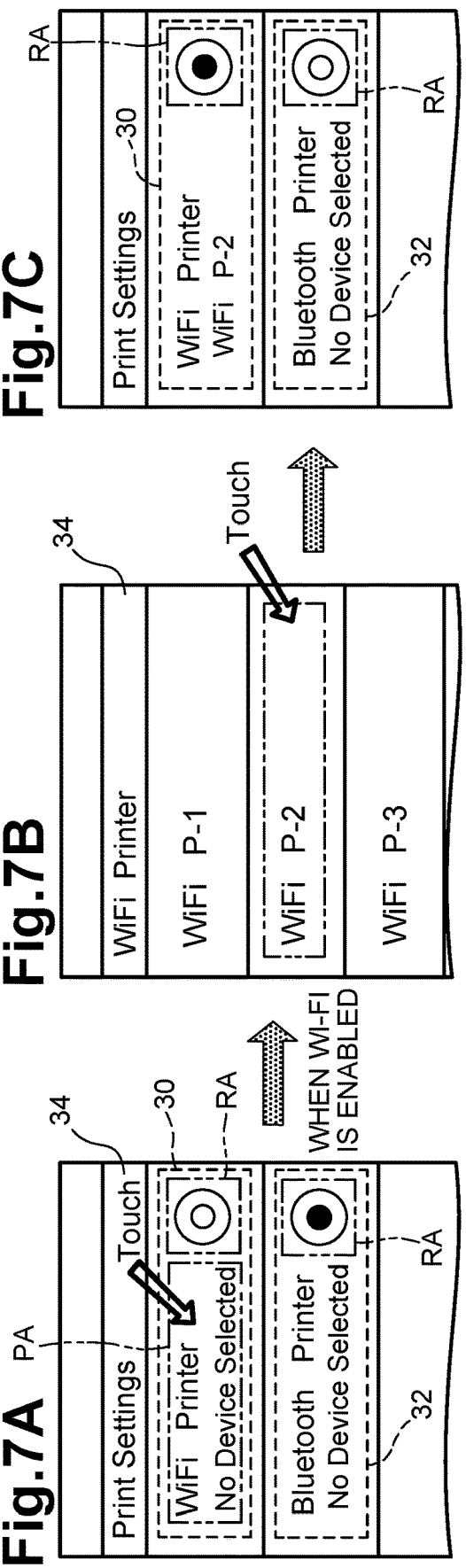
FIGS. 7A, 7B, 7C, 7D, and 7E are state diagrams depicting a transition of states of the display screen in response to selection of a printer selection field in the first illustrative embodiment according to one or more aspects of the disclosure.

FIG. 6 illustrates a procedure of a Wi-Fi® specifying process according to an illustrative embodiment. The Wi-Fi® specifying process may be implemented by a communication support program stored in the memory 16, which may be repeatedly performed by the CPU 14, for example, at predetermined intervals. The Wi-Fi® specifying process depicted in FIG. 6 may be performed concurrently with the Wi-Fi® communication support process depicted in FIG. 3.

First, in step S30, the CPU 14 may determine whether an input to the printer selection field PA in the selection support field 30 corresponding to communication using the Wi-Fi® system has been detected. The input to the printer selection field PA may be implemented by a user's input operation, for example, a touch to the printer selection field PA. When a positive determination is made in step S30, the CPU 14 may perform processing of steps S32 to S42 similar to the processing of steps S14 to S24 in FIG. 3. Then, when the processing of step S42 has been completed, the CPU 14 may perform processing of step S46 or processing of steps S46 and S48 similar to the processing of steps S26 and S28 in FIG. 3.

FIGS. 7A to 7E illustrate a situation that occurs when a negative determination is made in step S46. That is, even when the Bluetooth® system has been specified as the communication channel to be used first as apparent from the indication of the radio button RA in the selection support field 32 corresponding to communication using the Bluetooth® system in FIG. 7A, the communication channel to be used may be switched to the Wi-Fi® system (see FIG. 7C) by the specification of the Wi-Fi® printer (see FIG. 7B).

Figure 8:
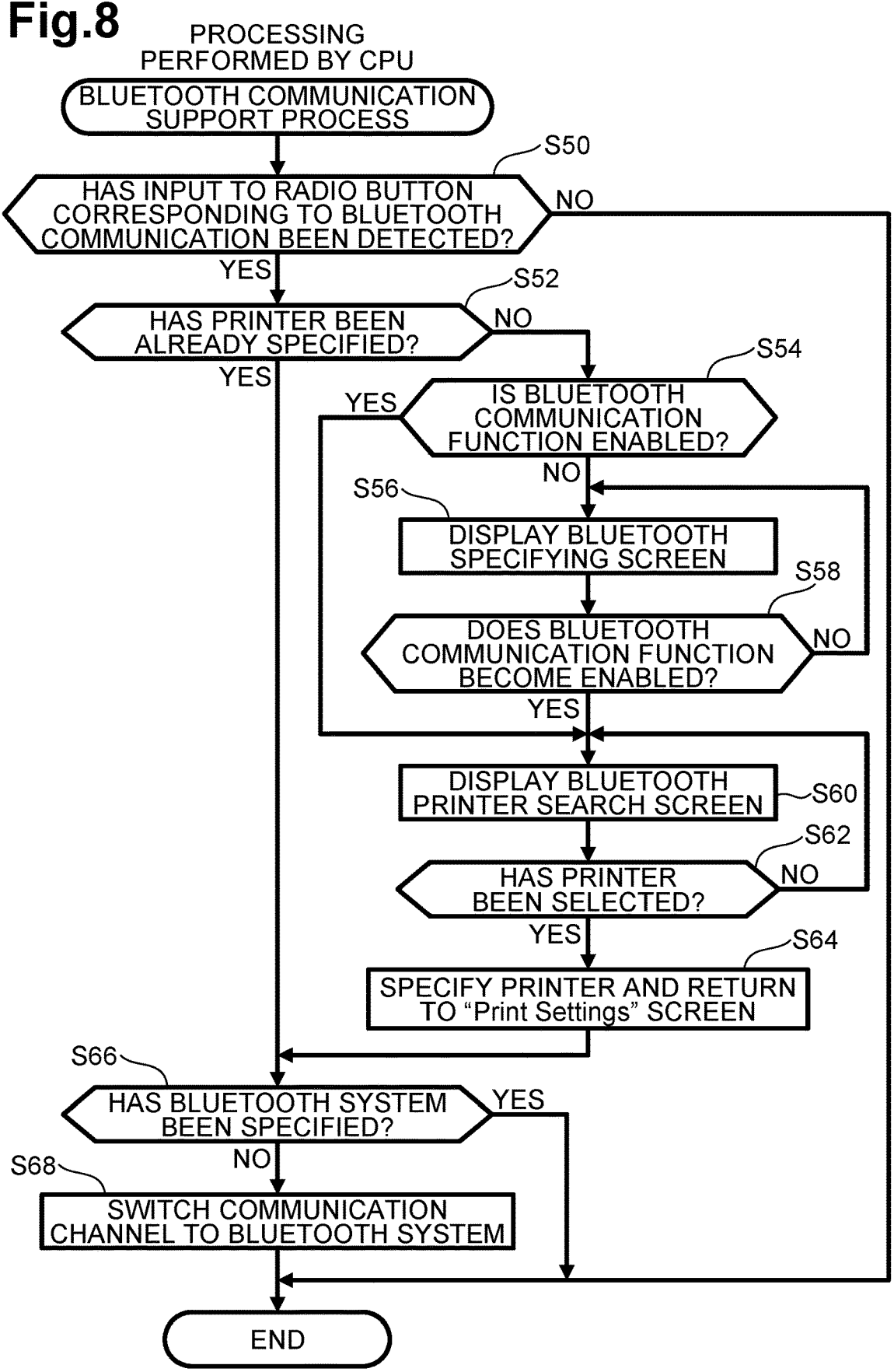
FIG. 8 is a flowchart depicting an example Bluetooth® communication support process in the first illustrative embodiment according to one or more aspects of the disclosure.

FIG. 8 illustrates a procedure of a Bluetooth® communication support process according to an illustrative embodiment. The Bluetooth® communication support process may be implemented by a communication support program stored in the memory 16, which may be repeatedly performed by the CPU 14, for example, at predetermined intervals. The Bluetooth® communication support process depicted in FIG. 8 may be performed concurrently with the Wi-Fi® communication support process depicted in FIG. 3 and the Wi-Fi® specifying process in depicted FIG. 6.

First, in step S50, the CPU 14 may determine whether an input to the radio button RA in the selection support field 32 corresponding to communication using the Bluetooth® system has been detected. When a positive determination is made in step S50, in step S52, the CPU 14 may determine whether a Bluetooth® printer to be used for communication with the mobile telephone device 10 has already been specified. When a negative determination is made in step S52, in step S54, the CPU 14 may determine whether a communication function using the Bluetooth® system (hereinafter, referred to as a "Bluetooth® communication function") is enabled. When a negative determination is made in step S54, the CPU 14 may display a Bluetooth® specifying screen on the LCD 22b in step S56. This situation may be illustrated in FIGS. 9A and 9D, for example. That is, as depicted in FIG. 9A, when a Bluetooth® connection is not established at the time of the selection of the radio button RA in the selection support field 32 corresponding to Bluetooth® communication, the screen may be switched to the Bluetooth® specifying screen depicted in FIG. 9D to prompt the user to enable the Bluetooth® communication function. In response to this, the user may operate the touch panel 22a in accordance with guidance displayed on Bluetooth® specifying screen to enable the communication function using the Bluetooth® system.

As the CPU 14 displays the Bluetooth® specifying screen, as depicted in FIG. 8, the CPU 14 may wait until the communication function using the Bluetooth® system becomes enabled by the user's operation for instructing the performance of communication using the Bluetooth® system (e.g., step S58). Then, when a positive determination is made in step S58 after the communication function using the Bluetooth® system becomes enabled by the user's operation or when a positive determination is made in step S54, the routine may proceed to step S60.

In step S60, the CPU 14 may display a Bluetooth® printer search screen. That is, as depicted in FIG. 9B, the CPU 14 may display, on the LCD 22b, a screen on which one or more communicable Bluetooth® printers may be listed as one or more candidates for a communication party device for Bluetooth® communication. For the Bluetooth® case, one or more printers that may be paired with the mobile telephone device 10 and registered by the OS may be listed. Therefore, in actual, one or more incommunicable printers may also be displayed. In preparation for a case where it may be desired to specify another Bluetooth® printer that may be different from the one or more listed Bluetooth® printers, a link to another screen for adding a new Bluetooth® printer may be preferably provided on the Bluetooth® printer search screen.

When the user performs an input operation for selecting a specific Bluetooth® printer, the CPU 14 may determine that a printer has been selected in processing of step S62 in FIG. 8 and the routine may proceed to step S64. In step S64, the CPU 14 may specify the selected printer as the communication party device for Bluetooth® communication and display the "Print settings" screen as depicted in FIG. 9C.

FIG. 9A illustrates a situation in which any printer has not been specified first. Therefore, for example, the indication representing that a Bluetooth® printer has not been specified yet, for example, a message "No Device selected", may be displayed in the selection support field 32. In FIG. 9C, the name of the specified Bluetooth® printer (e.g., "Bu P-1") may be displayed.

When the processing of step S64 in FIG. 8 has been completed or when a positive determination is made in step S52, the routine may proceed to step S66. In step S66, the CPU 14 may determine whether the Bluetooth® system has been specified as the communication channel for communication with the printer at the time the positive determination is made in step S50, and more specifically, immediately before the radio button RA in the selection support field 32 corresponding to communication using the Bluetooth® system is selected. When a negative determination is made in step S66, in step S68, the CPU 14 may switch the channel to be used for communication with the printer to the communication channel via Bluetooth® communication and specify the communication channel via Bluetooth® communication as the channel to be used for communication. When the channel to be used for communication is switched to use Bluetooth® communication, an indication that the communication channel to be used for communication with the printer is the Bluetooth® system may be stored in the memory 16. Thereafter, when an operation for performing communication with the printer is again performed after communication is performed with the printer and the communication session has ended, the Bluetooth® system may be specified as the communication channel to be used for communication with the printer, as the initial setting.

FIGS. 10A to 10D illustrate a situation that occurs when a negative determination is made in step S66. That is, even when the Wi-Fi® system has been specified as the communication channel to be used first as apparent from the indication of the radio button RA in the selection support field 30 corresponding to communication using the Wi-Fi® system in FIG. 10A, the communication channel to be used may be switched to the Bluetooth® system (see FIG. 10C) by the specification of the Bluetooth® printer (see FIG. 10B). For example, when the Bluetooth® system has been specified as the communication channel as depicted in FIG. 9A, the Bluetooth® system may be continuously selected as the communication channel after the Bluetooth® printer is selected. Therefore, the processing of switching the communication channel might not be performed.

When the processing of step S68 has been completed, when a negative determination is made in step S50, or when a positive determination is made in step S66, the CPU 14 may end an instance of the Bluetooth® communication support process.

Figure 11:
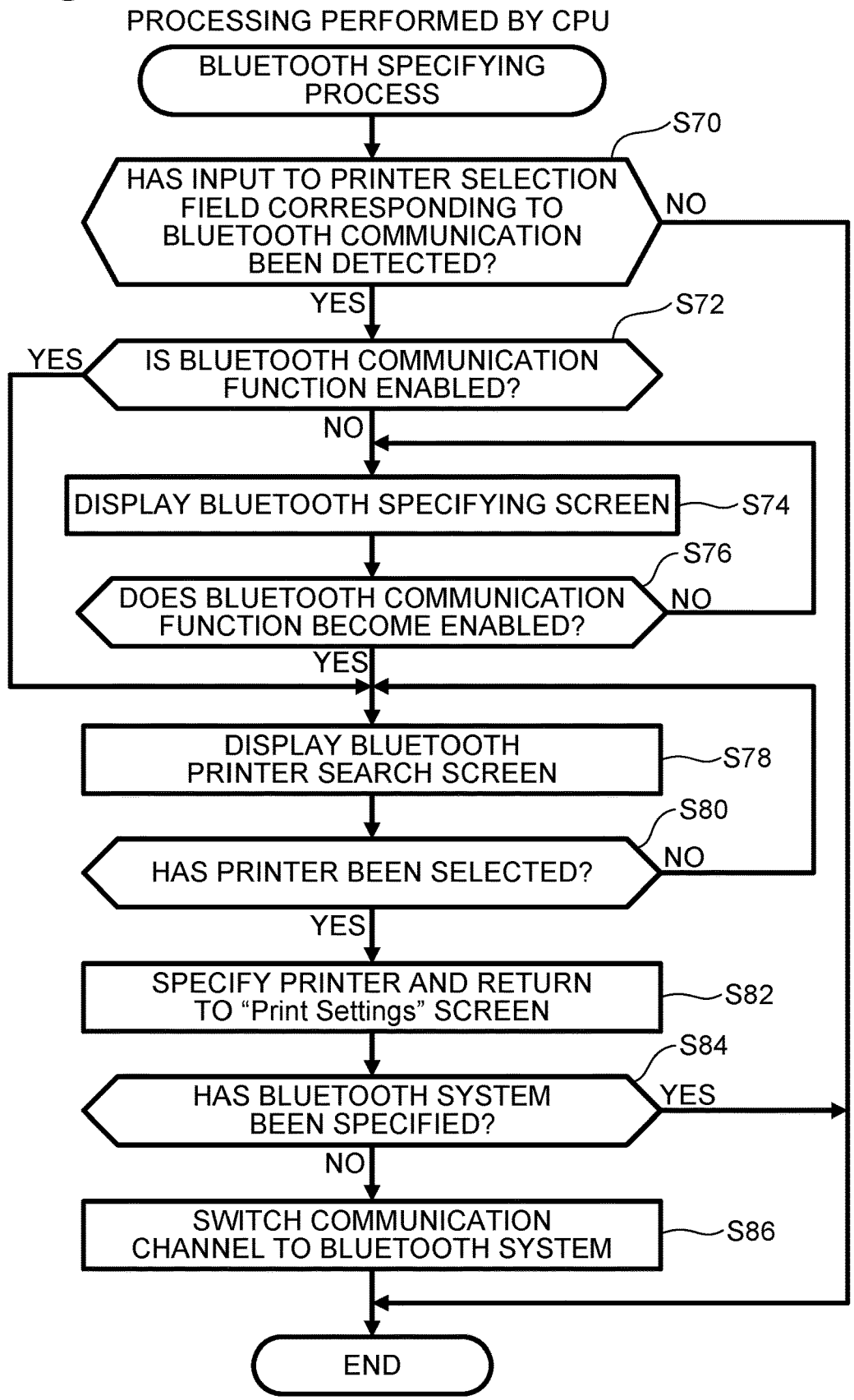
FIG. 11 is a flowchart depicting an example Bluetooth® specifying process in the first illustrative embodiment according to one or more aspects of the disclosure.

FIG. 11 illustrates a procedure of a Bluetooth® specifying process according to an illustrative embodiment. The Bluetooth® specifying process may be implemented by a communication support program stored in the memory 16, which may be repeatedly performed by the CPU 14, for example, at predetermined intervals. The Bluetooth® specifying process depicted in FIG. 11 may be performed concurrently with the Wi-Fi® communication support process depicted in FIG. 3, the Wi-Fi® specifying process depicted in FIG. 6, and the Bluetooth® communication support process depicted in FIG. 8.

First, in step S70, the CPU 14 may determine whether an input to the printer selection field PA in the selection support field 32 corresponding to communication using the Bluetooth® system has been detected. The input to the printer selection field PA may be implemented by a user's input operation, for example, a touch to the printer selection field PA. When a positive determination is made in step S70, the CPU 14 may perform processing of steps S72 to S82 similar to the processing of steps S54 to S64 in FIG. 8. Then, when the processing of step S82 has been completed, the CPU 14 may perform processing of step S84 or processing of S84 and S86 similar to the processing of steps S66 and S68 in FIG. 8.

FIGS. 12A to 12D illustrate a situation that occurs when a negative determination is made in step S84. That is, even when the Wi-Fi® system has been specified as the communication channel to be used first as apparent from the indication of the radio button RA in the selection support field 30 corresponding to communication using the Wi-Fi® system in FIG. 12A, the communication channel to be used may be switched to the Bluetooth® system (see FIG. 12C) by the specification of the Bluetooth® printer (see FIG. 12B).

According to the above-described illustrative embodiment, the following effects may be obtained.

At the time of the input operation to one of the radio buttons RA, when a printer has not been specified as the communication target to be used for communication using the communication channel (e.g., the Wi-Fi® system or the Bluetooth® system) corresponding to the radio button RA selected by the input operation, the screen may be switched to the printer search screen on which the specification of a printer may be available (see FIGS. 4B, 5B, 7B, 9B, and 10B). Therefore, this configuration may facilitate the user's input operation.

The user interface 22 may be configured with the LCD 22b and the touch panel 22a placed over the LCD 22b. This configuration may implement the user-friendly display such that the user may readily find a field on which a desired operation may be performed. This configuration may also have an advantage that, on the LCD 22b, the locations for displaying the selection support fields 30 and 32, respectively, may also be used as the locations for displaying the printers on the printer search screen.

Each of the selection support fields 30 and 32 may comprise the printer selection field PA for selecting a printer and the radio button RA for selecting a communication channel. With this configuration, the user may readily perform the selection of a printer and the selection of a communication channel.

For the printer specification on the printer search screen, when the communication channel corresponding to the specified printer has not been specified as the channel to be used for communication, the currently-specified communication channel may be switched to the newly-specified communication channel. Therefore, this configuration may facilitate the user's input operation.

At the time of the selection of a communication channel for which a printer to be used has not been specified, when the communication function using the selected communication channel is disenabled, the screen for enabling the communication function may be displayed to prompt the user to enable the communication function. As the communication function becomes enabled, the screen may be switched to the printer search screen. This configuration may provide a user-friendly process to assist the user in enabling a previously disabled communication channel that the user desires to use for printing. The user may enable a communication channel without closing the communication support program used for selecting print settings.

One of the Wi-Fi® system and the Bluetooth® system may always be specified as the communication channel to be used for communication with the printer. In addition, even when the channel that has not been specified as the communication channel to be used first is selected by the input operation to one of the printer selection fields PA, the screen may be switched to the printer search screen directly. This configuration may also facilitate the user's input operation.

The radio buttons RA may have different appearances depending on whether which one of the Wi-Fi® system or the Bluetooth® system has been selected as the communication channel to be used for communication with the printer. For example, the radio buttons RA may be partially (or completely) filled to indicate that a corresponding communication channel is selected. With this configuration, the user may readily confirm the specified communication channel.

The name of the specified printer may be displayed in the printer selection field PA. Thus, the user may readily confirm the specified printer.

When the printer has not been specified, the indication representing that the printer has not been specified may be displayed in the printer selection field PA. Thus, when the printer is not specified, the user may readily confirm the facts that the printer has not been specified.

Second Illustrative Embodiment

Hereinafter, a second illustrative embodiment is described with reference to the accompanying drawings, mainly focusing on different parts from the first illustrative embodiment.

Figure 13:
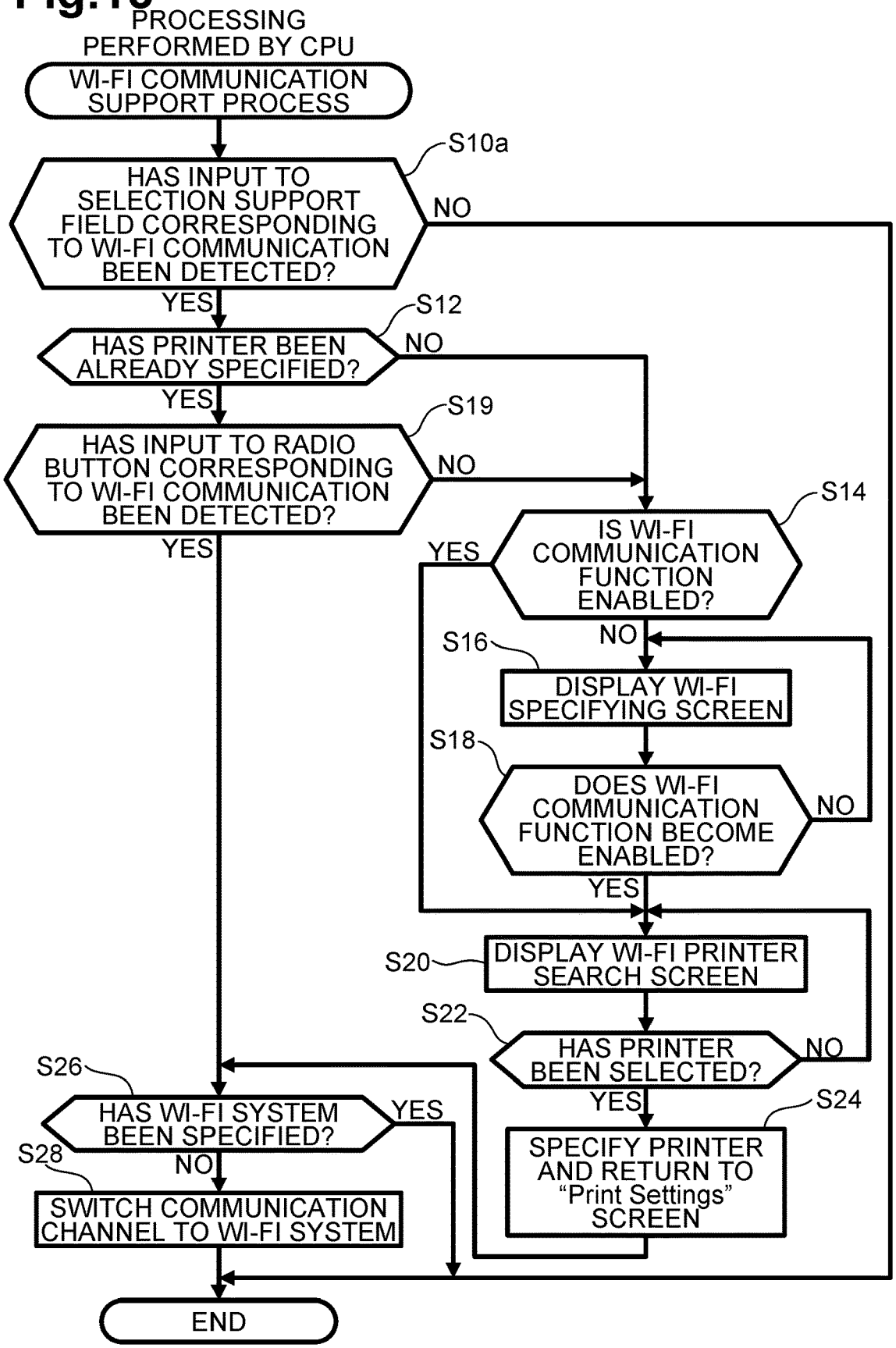
FIG. 13 is a flowchart depicting an example Wi-Fi® communication support process in a second illustrative embodiment according to one or more aspects of the disclosure.

FIG. 13 illustrates a procedure of a Wi-Fi® communication support process according to the second illustrative embodiment. The Wi-Fi® communication support process may be implemented by which the communication support program stored in the memory 16 may be repeatedly performed by the CPU 14, for example, at predetermined periods. For the sake of convenience, the same step numbers are assigned in FIG. 13 to the steps that correspond to the steps in FIG. 3.

In step S10a, the CPU 14 may determine whether an input to the selection support field 30 corresponding to communication using the Wi-Fi® system has been detected. When a positive determination is made in step S10a, the routine may proceed to step S12. When a positive determination is made in step S12, in step S19, the CPU 14 may determine whether an input to the radio button RA corresponding to communication using the Wi-Fi® system has been detected in step S10a. When a positive determination is made in step S19, the routine may proceed to step S26. When a negative determination is made in step S19, the routine may proceed to step S14.

The above described process according to the second illustrative embodiment may also offer similar user usability of the touch panel 22a to the user usability when the processes depicted in FIGS. 3 and FIG. 6 are performed.

The Bluetooth® communication support process may also be performed in a similar manner to the Wi-Fi® communication support process depicted in FIG. 13. Accordingly, a description of the Bluetooth® communication support process is omitted.

Other Embodiments

While the disclosure has been described in detail with reference to the specific embodiments thereof, they are merely examples, and various changes, arrangements, and modifications may be applied therein without departing from the spirit and scope of the disclosure. Variations of the illustrative embodiments are enumerated below.

In the above-described illustrative embodiments, one of the radio button RA corresponding to communication using the Wi-Fi® system and the radio button RA corresponding to communication using the Bluetooth® system may always be selected. However, in other embodiments, for example, no channel may be specified in an initial state because there is no memory of the previous printer specification. In this case, for example, the radio buttons RA of the respective communication channels may have the same status (e.g., either both are selected or both are unselected).

In the above-described illustrative embodiments, once the settings are specified, the settings may be stored and maintained unless the stored settings are changed. However, in other embodiments, for example, when an amount of energy stored in the mobile telephone device 10 becomes a predetermined amount or less, the specified information may be erased. In this case, it may be unnecessary to store the specification information in the memory (e.g., the nonvolatile memory) that may hold data regardless of the presence or absence of power supply, for example, a flash memory. With this configuration, the storage area of the nonvolatile memory may be reduced.

The shape of the selection support fields 30 and 32 might not be limited to the rectangular shape. In other embodiments, for example, the selection support fields 30 and 32 may have a circular shape. In this case, in each of the selection support fields 30 and 32, a printer selection field (as an example of a device selection field) may be assigned to one semicircle of the circular field and a radio button (as an example of communication channel selection field) may be assigned to the other semicircle of the circular field.

In the above-described illustrative embodiments, a selected radio button may appear different from an unselected radio button. However, in other embodiments, for example, the backgrounds (either completely or partially) of the selection support fields 30 and 32 may have different colors.

In the above-described illustrative embodiments, the Bluetooth® system and the Wi-Fi® system may be taken as examples of the channels to be used for communication with the printer. However, in other embodiments, for example, a communication channel via infrared rays, a communication channel via a universal serial bus ("USB"), or a communication channel via a wired LAN may be adopted as the channel to be used for communication with the printer. The number of communication channels listed on the LCD 22b might not be limited to two. In other embodiments, for example, three or more communication channels may be listed.

In this case, all selection support fields corresponding to the three or more communication channels, respectively, might not be listed on the display unit to fit the ones that are listed on a single screen. Particularly, when a relatively large number of communication channels are available to be listed and each display field of the selection support fields requires a predetermined size or larger in terms of readability, it might be difficult to list all the selection support fields on the single screen. In this case, the display screen may be allowed to display all the communication channels through a discontinuous change of the display screen from one to another (e.g., the switching of the display screen) or through a continuous change of the display screen at a flick of the touch panel 22a to scroll the display screen.

The method of providing the function of permitting the printer specification on condition that the communication function is enabled in step S14 or S18 in FIG. 3 might not be limited to the specific embodiments. In other embodiments, for example, when a positive determination is made in step S10, the CPU 14 may perform appropriate one or more of the processing of steps S14, S16, and S18 and then perform the processing of step S12. Also, for example, the CPU 14 may perform appropriate one or more of the processing of steps S14, S16, and S18 subsequent to the processing of step S26 in the Wi-Fi communication support process depicted in FIG. 3.

The user interface might not be limited to the user interface configured with the LCD 22b and the touch panel 22a placed on one another. In other embodiments, for example, a display unit and an input unit may be disposed in different areas. In this case, also, for example, the user interface may comprise the input unit for selecting the printer selection fields PA and the radio buttons RA. When a printer to be used for communication via a communication channel corresponding to an operated radio button has not been specified, the printer search screen may be displayed on the display unit. At that time, the printer specification on the printer search screen may be allowed to be performed on the input unit.

In some instances, a printer may already be associated with a communication channel so that selection of the printer may automatically specify a channel to be used for communication. For example, after a printer is specified as described above, the communication channel for which the printer has been specified may be specified automatically as the channel to be used for communication.

In some embodiments, both the printer selection field PA and the communication channel selection field for selecting a communication channel (e.g., the radio button RA) might not be provided. In other embodiments, for example, a common field for selecting a printer regardless of the communication channel may be displayed along with one or more communication channel selection fields for selecting a communication channel for communicating with the printer in the common field. In this case, at the time of an input operation to one of the communication channel selection fields, if a printer to be used has not been specified, a printer selection screen may be displayed to allow a printer to be selected. This configuration may also allow a user to avoid having to perform a separate input operation, and therefore, may also simplify the user's input operation.

Again, in some embodiments, both the printer selection field PA and the communication channel selection field for selecting a communication channel (e.g., the radio button RA) might not be provided. In other embodiments, for example, a printer selection field for each communication channel may be provided. In this case, when a printer selection field is selected, a communication channel corresponding to the printer selection field may be specified automatically and a printer selection screen may be displayed to allow the user to select a printer available for use with the automatically specified communication channel. This configuration may also allow a user to avoid having to perform a separate input operation for specifying a communication channel, and thus may also simplify the user's input operation. When the selected printer selection field already specifies a target printer, the printer selection screen (e.g., as depicted in FIG. 4B) may be displayed and the target printer may be selected again (or confirmed).

In the above-described illustrative embodiments, a printer may be taken as an example of the external device as the communication target. However, the communication-target device might not be limited to the printer. In other embodiments, for example, the communication-target device may be a scanner, a multifunction device, a personal computer, or another mobile telephone device. In short, the communication-target device may be any device that may be allowed to perform communication with the mobile telephone device 10.

In the above-described illustrative embodiments, the mobile telephone device 10 may be taken as an example of the communication device. However, the communication device might not be limited to the mobile telephone device 10. In other embodiments, for example, the communication device may be a tablet terminal not having a telephone function or a personal computer.

Some or all of the functions of the application program may be performed by special hardware, instead of software.

What is claimed is:

1. A non-transitory computer-readable storage medium storing computer-readable instructions therein that, when executed by a processor of a communication device comprising a first communication unit, a second communication unit, and a display unit, instruct the communication device to execute:

displaying, on the display unit, a first option for selecting the first communication unit;

displaying, on the display unit, a second option for selecting the second communication unit;

determining, at a time of accepting a selection operation for the first option in a state that the second communication unit is selected, whether an external printer configured to communicate with the first communication unit has been specified, wherein the acceptance of the selection operation deselects the second communication unit;

displaying, on the display unit, based on the determining that the external printer has been specified, a selection screen comprising a communication selection field and a printer selection field, the communication selection field indicating that the first communication unit is selected and the printer selection field indicating that the external printer has been specified; and displaying, on the display unit, based on the determining that the external printer has not been specified, a printer search screen indicating one or more external printers, which are found as a result of searching for an external printer configured to communicate with the first communication unit.

2. The non-transitory computer-readable storage medium according to claim 1, wherein the computer-readable instructions, when executed by the communication device, further instruct the communication device to:

determine, based on selection of the first option and the determining that one of the one or more external printers has been specified, whether the first communication unit has been set to be used for communication with the external printer.

3. The non-transitory computer-readable storage medium according to claim 2, wherein the computer-readable instructions, when executed by the communication device, further instruct the communication device to:

set, based on the determining that the first communication unit has not been set to be used for communication with the external printer, the first communication unit to be used for communication with the external printer.

4. The non-transitory computer-readable storage medium according to claim 1, wherein the computer-readable instructions, when executed by the communication device, further instruct the communication device to:

determine, based on selection of the first option, whether the first communication unit is enabled; and display, based on determining that the first communication unit is not enabled, a communication unit enablement screen comprising an enablement option for selecting the first communication unit to be enabled.

5. The non-transitory computer-readable storage medium according to claim 1, wherein the computer-readable instructions, when executed by the communication device, further instruct the communication device to:

determine, based on selection of the first option, whether the first communication unit is enabled; and after determining that the first communication unit is not enabled, display a printer search screen on a condition that the first communication unit becomes enabled.

6. The non-transitory computer-readable storage medium according to claim 1, wherein the computer-readable instructions, when executed by the communication device, further instruct the communication device to:

determine, based on selection of the first option and determination that the external printer has not been specified, whether the first communication unit is enabled; and display, based on determining that the first communication unit is enabled, a printer search screen.

7. The non-transitory computer-readable storage medium according to claim 1, wherein the computer-readable instructions, when executed by the communication device, further instruct the communication device to:

specify, based on a selection of one of the one or more external printers displayed on the printer search screen, a particular external printer to be used for communication with the communication device.

8. The non-transitory computer-readable storage medium according to claim 1, wherein the computer-readable instructions, when executed by the communication device, further instruct the communication device to:

display, based on selection of the first option, the first option differently than the second option to indicate that the first communication unit was previously set to be used for communication with the external printer.

9. The non-transitory computer-readable storage medium according to claim 1, wherein the computer-readable instructions, when executed by the communication device, further instruct the communication device to:

display a name of the external printer to be used for communication with the first communication unit.

10. The non-transitory computer-readable storage medium according to claim 1, wherein the computer-readable instructions, when executed by the communication device, further instruct the communication device to:

display an indication that the external printer has not been specified when the external printer has not been specified.

11. The non-transitory computer-readable storage medium according to claim 1, wherein the first communication unit comprises a Wi-Fi interface, and wherein the second communication unit comprises a Bluetooth interface.

12. A non-transitory computer-readable storage medium storing computer-readable instructions therein that, when executed by a processor of a communication device, the communication device comprising a first communication unit, a second communication unit, and a display unit, the communication device being configured to communicate with one or more external printers, instruct the communication device to execute:

displaying, on the display unit, a first option for selecting the first communication unit;

displaying, on the display unit, a second option for selecting the second communication unit;

determining, at a time of accepting a selection operation for the first option in a state that the second communication unit is selected, whether one of the one or more external printers has been specified, wherein the acceptance of the selection operation deselects the second communication unit;

displaying, on the display unit, based on the determining that one of the one or more external printers has been specified, a selection screen comprising a communication selection field and a printer selection field, the communication selection field indicating that the first communication unit is selected and the printer selection field indicating that the external printer of the one or more external printers has been specified; and displaying, on the display unit, based on the determining that no external printer has been specified, a printer search screen indicating the one or more external printers which are found as a result of searching for an external printer.

13. A communication device comprising:
a first communication unit;
a second communication unit;
a display unit;
a processor;
memory storing instructions that, when executed by the processor cause the communication device to:
  display, on the display unit, a first option for selecting the first communication unit;
  displaying, on the display unit, a second option for selecting the second communication unit;
  determining, at a time of accepting a selection operation for the first option in a state that the second communication unit is selected, whether one or more external printers has been specified, wherein the acceptance of the selection operation deselects the second communication unit;
  displaying, on the display unit, based on the determining that one of the one or more external printers has been specified, a selection screen comprising a communication selection field and a printer selection field, the communication selection field indicating that the first communication unit is selected and the printer selection field indicating that the external printer of the one or more external printers has been specified; and
  displaying, on the display unit, based on the determining that no external printer has been specified, a printer search screen indicating the one or more external printers which are found as a result of searching for an external printer.

14. A computer-implemented method comprising:
displaying, on a display unit of a communication device, a first option for selecting a first communication unit of the communication device;
displaying, on the display unit, a second option for selecting a second communication unit of the communication device;
determining, at a time of accepting a selection operation for the first option in a state that the second communication unit is selected, that one or more external printers has been specified, wherein the acceptance of the selection operation deselects the second communication unit; and
displaying, on the display unit, based on the determining that one of the one or more external printers has been specified, a selection screen comprising a communication selection field and a printer selection field, the communication selection field indicating that the first communication unit is selected and the printer selection field indicating that the external printer of the one or more external printers has been specified.

15. The non-transitory computer-readable storage medium according to claim 1, wherein the external printer comprises an image forming device.

* * * * *